(12) United States Patent
Baeuerle et al.

(10) Patent No.: US 7,380,446 B2
(45) Date of Patent: Jun. 3, 2008

(54) METHOD FOR DETERMINING THE ROTARY SPEED OF A COMPRESSOR, ESPECIALLY A TURBOCHARGER

(75) Inventors: Michael Baeuerle, Ditzingen-Heimerdingen (DE); Uwe Kassner, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 77 days.

(21) Appl. No.: 11/601,019

(22) Filed: Nov. 16, 2006

(65) Prior Publication Data
US 2007/0144174 A1  Jun. 28, 2007

(30) Foreign Application Priority Data
Nov. 28, 2005  (DE) ............... 10 2005 056 517

(51) Int. Cl.
*G01M 15/00* (2006.01)
(52) U.S. Cl. .................................. 73/118.1
(58) Field of Classification Search ........... 73/115, 73/116, 117.2, 117.3, 118.1
See application file for complete search history.

(56) References Cited

U.S. PATENT DOCUMENTS

| | | | |
|---|---|---|---|
| 6,928,360 B2* | 8/2005 | Baeuerle et al. ............ | 701/102 |
| 7,296,562 B2* | 11/2007 | Withrow et al. ......... | 123/559.1 |
| 2004/0250801 A1* | 12/2004 | Baeuerle ..................... | 123/565 |
| 2005/0193810 A1* | 9/2005 | Gladden ................... | 73/119 R |
| 2006/0032224 A1* | 2/2006 | Akins et al. ................. | 60/602 |
| 2008/0011071 A1* | 1/2008 | Figura ....................... | 73/118.1 |

\* cited by examiner

*Primary Examiner*—Eric S McCall
(74) *Attorney, Agent, or Firm*—Kenyon & Kenyon LLP

(57) ABSTRACT

A method for determining the rotary speed of a compressor, e.g., a turbocharger of an internal combustion engine, includes detecting the pressure in a region that is downstream from the compressor and generating a corresponding pressure signal. The rotary speed of the compressor is obtained from periodic fluctuations of at least one component of the pressure signal.

15 Claims, 3 Drawing Sheets

METHOD FOR DETERMINING THE ROTARY SPEED OF A COMPRESSOR, ESPECIALLY A TURBOCHARGER

FIELD OF THE INVENTION

The present invention relates to a method for determining the rotary speed of a compressor, e.g., a turbocharger of an internal combustion engine, as well as to a computer program and/or a control device for controlling an internal combustion engine.

BACKGROUND INFORMATION

In internal combustion engines, e.g., gasoline or Diesel piston engines, to increase the performance, the air charge in a combustion chamber of the internal combustion engine is increased by the use of a compressor, such as an exhaust gas turbocharger. The pressure with which the air is pressed into the combustion chamber of the internal combustion engine is also designated as boost pressure, and is generally measured in the vicinity of the combustion chamber by a pressure sensor. The pressure signal is supplied to a closed control loop which controls the exhaust gas turbocharger and thereby sets a desired boost pressure.

Exhaust-gas turbochargers have a characteristic time constant, and thus they react comparatively sluggishly to changed control signals, which makes the regulation of the boost pressure more difficult. Therefore, it is advantageous if a direct state variable of the exhaust gas turbocharger that is to be regulated is recorded, e.g., the rotary speed of the compressor of the turbocharger, which is particularly suitable for this purpose.

It is an object of the present invention to provide a method which makes possible a cost-effective and reliable recording of the rotary speed of a compressor.

SUMMARY OF THE INVENTION

In an example method according to the present invention, the pressure sensor that is utilized for the determination of the boost pressure is also used for determining the rotary speed of the compressor. This is based on the recognition that usual compressors do not convey the air continuously, but in a "gushing manner" with respect to a certain location downstream from the compressor. This is caused by the fact that, for example, in an axial compressor, each time that a vane of the compressor wheel passes a certain position, the speed, and thereby also the pressure, of the conveyed air changes. This leads to periodic pressure fluctuations, at least at certain locations downstream from the compressor, whose periodicity is related to the rotary speed of the compressor. This relationship is utilized, according to the present invention, to obtain the rotary speed of the compressor.

As a result, a non-contact method for ascertaining the rotary speed of the compressor is made available, which works on a very robust, basic physical principle and is therefore highly reliable. In addition, in accordance with the method of the present invention, the efficiency of the intake systems of the internal combustion engine and the exhaust gas turbocharger is not reduced, since no additional sensor system is required in comparison to the usual numbers of sensor systems deployed in internal combustion engines. Also, because of the non-contact measurement, if there is any wear, it is slight. Finally, pressure sensors are comparatively simple and inexpensive types of sensor whose signals are able to be simply processed.

Directly downstream from the compressor, the periodic fluctuations in the pressure, which are important to the method according to the present invention, and thus also the recorded pressure signals, are particularly concise, which simplifies the evaluation and thus also the determination of the rotary speed. The costs of assembly are reduced even more if the pressure sensor is integrated into a control component of the compressor, e.g., a pop-off valve. Such a pop-off valve is used as a bypass of the compressor, which is opened in response to the closing of a throttle valve of the internal combustion engine, in order to enable as fast a pressure reduction as possible.

For the separation of the periodic fluctuations from the pressure signal, high-pass filtering can be used, which is simple to implement in software technology. From the separated periodic fluctuations, which are also designated as "alternating components" of the pressure signal, the frequency is able to be ascertained in a simple manner, e.g., by a Fourier transform. By dividing the frequency by the number of vanes of the compressor, or rather, of the compressor wheel, one directly obtains the rotary speed of the compressor.

From the signal of the pressure sensor, not only can the rotary speed of the compressor be obtained, but the boost pressure can also be ascertained, which is an important operating variable for the control of an internal combustion engine. The corresponding pressure value is simply obtained by an averaging of the pressure signal, for instance by low-pass filtering.

However, since the pressure sensor is situated advantageously in the vicinity of the compressor, and since there are various other components between the compressor and the combustion chambers, e.g., a charge-air cooler and a throttle valve, in such a case, the average value of the pressure signal does not correspond to the charge air that is of interest for the control of the internal combustion engine. However, the desired value of the charge air can be obtained in a simple way by correcting the average value of the pressure signal appropriately.

The correction factors used for this are ascertained in preliminary tests, for instance, on a test stand, for the specific type of internal combustion engine. The accuracy of the method is able to be improved in the process if at least one correction factor is used that is a function of a current operating variable of the internal combustion engine, e.g., of an air mass throughput or an air volume throughput.

Because of the position of the pressure sensor in the immediate vicinity of the compressor, its pressure signal can also be used for the functional monitoring of an air filter. For this purpose, the difference between the ascertained pressure and the pressure of an environmental pressure sensor is ascertained. If the pressure reduction exceeds a certain measure, the air filter should be replaced.

DETAILED DESCRIPTION

Figure 1:
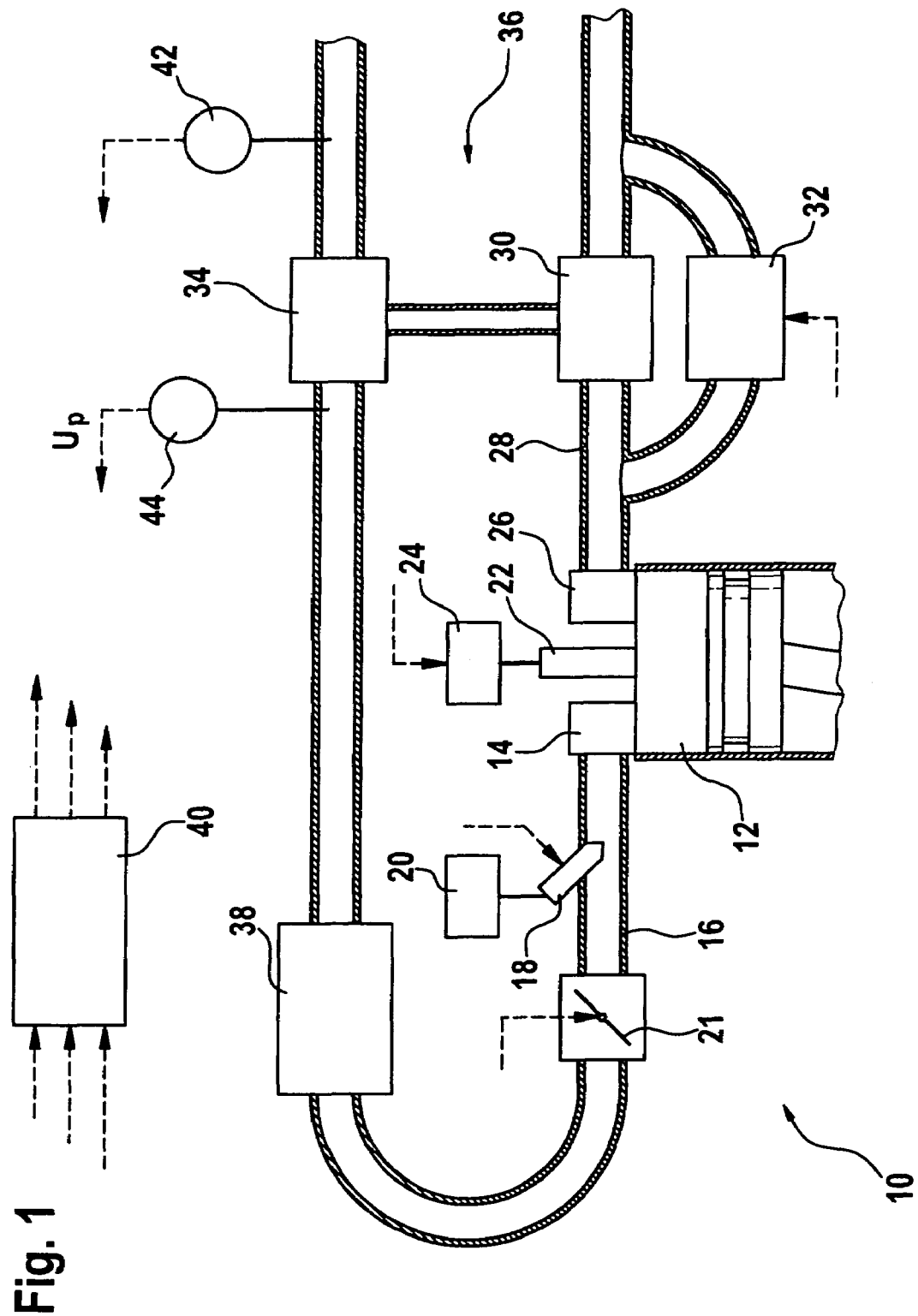
FIG. 1 shows a schematic representation of an internal combustion engine having an exhaust gas turbocharger and a pressure sensor according to the present invention.

In FIG. 1, an internal combustion engine in its entirety is designated by reference numeral 10. Although internal combustion engine 10 shown in FIG. 1 is designed as a gasoline internal combustion engine having intake manifold injection, however, important basic contents of the following description apply in exactly the same way to Diesel internal combustion engines, as well as to internal combustion engines having direct fuel injection.

The internal combustion engine 10 includes a plurality of cylinders, of which at present only one is shown, which includes a combustion chamber 12. Combustion air reaches the latter through an intake valve 14 via an intake duct 16. Into this fuel is injected, immediately upstream of intake valve 14, by an injector 18, which is connected to a fuel system 20. Upstream of the latter, there is a throttle valve 21 in intake duct 16.

A fuel-air mixture present in combustion chamber 12 is ignited by a spark plug 22, which is connected to an ignition system 24. Hot combustion exhaust gases are carried off from combustion chamber 12 through an exhaust valve 26 and an exhaust pipe 28. In the exhaust pipe there is a turbine 30, which is able to be bypassed via a bypass valve 32.

A compressor 34 is situated in intake duct 16, which is mechanically connected to turbine 30. Turbine 30 and compressor 34 together form an exhaust gas turbocharger 36. For the compression of air, compressor 34 has a plurality of compressor vanes or compressor blades, which are not shown in FIG. 1, however. The intake air heated by the compression is cooled by a charge-air cooler 38, which is situated in intake duct 16, between compressor 34 and throttle valve 21.

The operation of internal combustion engine 10 is controlled and regulated by a control and regulating device 40. In particular, throttle valve 21, injector 18, ignition system 24 and bypass valve 32 are controlled by control and regulating device 40. The latter receives signals from various sensors, such as from an HFM sensor 42 which records the air mass flowing through intake duct 16 upstream of compressor 34, and from a pressure sensor 44, which records the current pressure in intake duct 16 immediately downstream from compressor 34.

The combustion air supplied to combustion chamber 12 is compressed by compressor 34, which makes possible a greater performance of internal combustion engine 10. The pressure of the air charge pressed into combustion chamber 12 (the "boost pressure") is made available by pressure sensor 44 in a manner that will be shown below, and is adjusted in a closed control loop by control and regulating device 40. To do this, the performance of turbine 30 (and thereby the performance of compressor 34), is varied by opening bypass valve 32 more or less.

Figure 2:
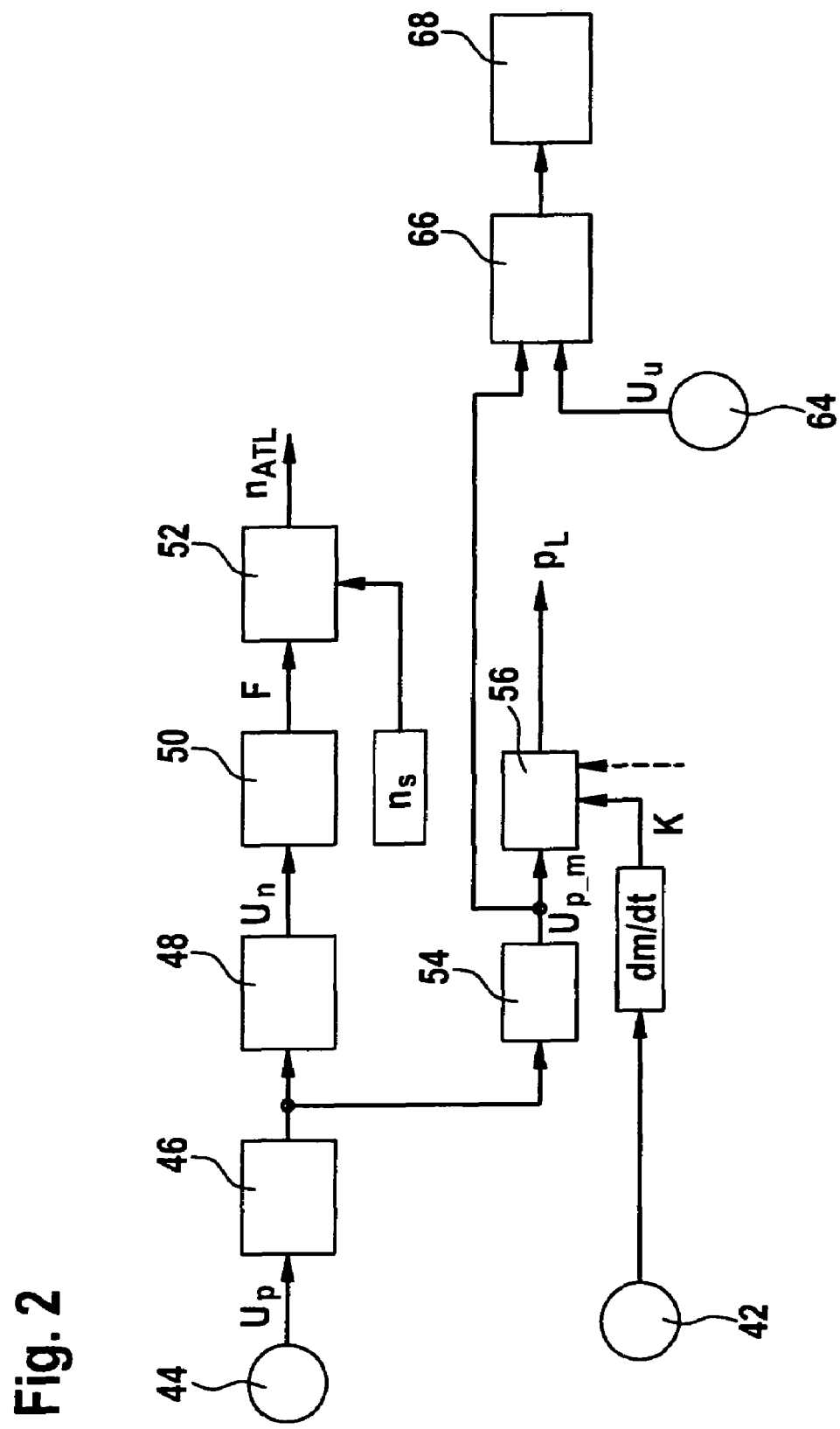
FIG. 2 shows a schematic flowchart of an example method for evaluating the signals made available by the pressure sensor shown in FIG. 1.

In order to achieve regulation of the boost pressure that is as rapid and precise as possible, the boost pressure is regulated not only based on the boost pressure made available by pressure sensor 44, but also based on the current rotary speed of compressor 34. Boost pressure $p_L$ and rotary speed $n_{ATL}$ are ascertained starting from a signal $U_p$ that is made available by pressure sensor 44, with the aid of a method which will now be explained with reference to FIG. 2.

First of all, output signal $U_p$ of pressure sensor 44 is submitted in 46 to an A/D conversion. Then, in 48, periodic fluctuations ("alternating components") $U_n$ of signal $U_p$ are separated. These periodic fluctuations $U_n$ are brought about by the pressure waves of compressor 34, which are caused by the individual compressor vanes or compressor blades of compressor 34. In order for the periodic fluctuations of compressor 44 to be able to be recorded, it is necessary to situate pressure sensor 44 comparatively close to compressor 34, as shown in FIG. 1. Besides that, pressure sensor 44 has to have appropriate dynamics.

The periodic fluctuations separated by the high-pass filter in 48 are now submitted in 50 to a Fourier transformation, by which frequency F of the periodic fluctuations is ascertained. This frequency F is the product of rotary speed $n_{ATL}$ and the number $n_S$ of the compressor blades or compressor vanes. Therefore, in 52, ascertained frequency F is divided by the number $n_S$ of the compressor blades, which finally leads to the rotary speed $n_{ATL}$ of compressor 34.

As was mentioned above, signal $U_p$ of pressure sensor 44 is also used to ascertain boost pressure $P_L$ which prevails immediately upstream of intake valve 14 and in combustion chamber 12 itself. For this purpose, signal $U_p$ is submitted to a low-pass filtering in 54, which leads to an average value $U_{p-m}$ of pressure signal $U_p$. This average value $U_{p-m}$ is equivalent to the pressure between compressor 34 and boost pressure cooler 38. In order to obtain from this the pressure immediately upstream of intake valve 14, the value $U_{p-m}$ is submitted to a correction in 56, by applying to it, in a multiplicative or additive way, at least one correcting factor, here designated as K.

Correcting factor K is determined during the design of the parameters of control and regulating device 40, for instance, on an engine test stand, by measuring the pressure before and after boost pressure cooler 38 at different operating states of internal combustion engine 10. Correcting factor K may, in turn, be a function of operating variables of internal combustion engine 10, for instance, of air mass throughput dm/dt, which is recorded by HFM sensor 42.

Figure 3:
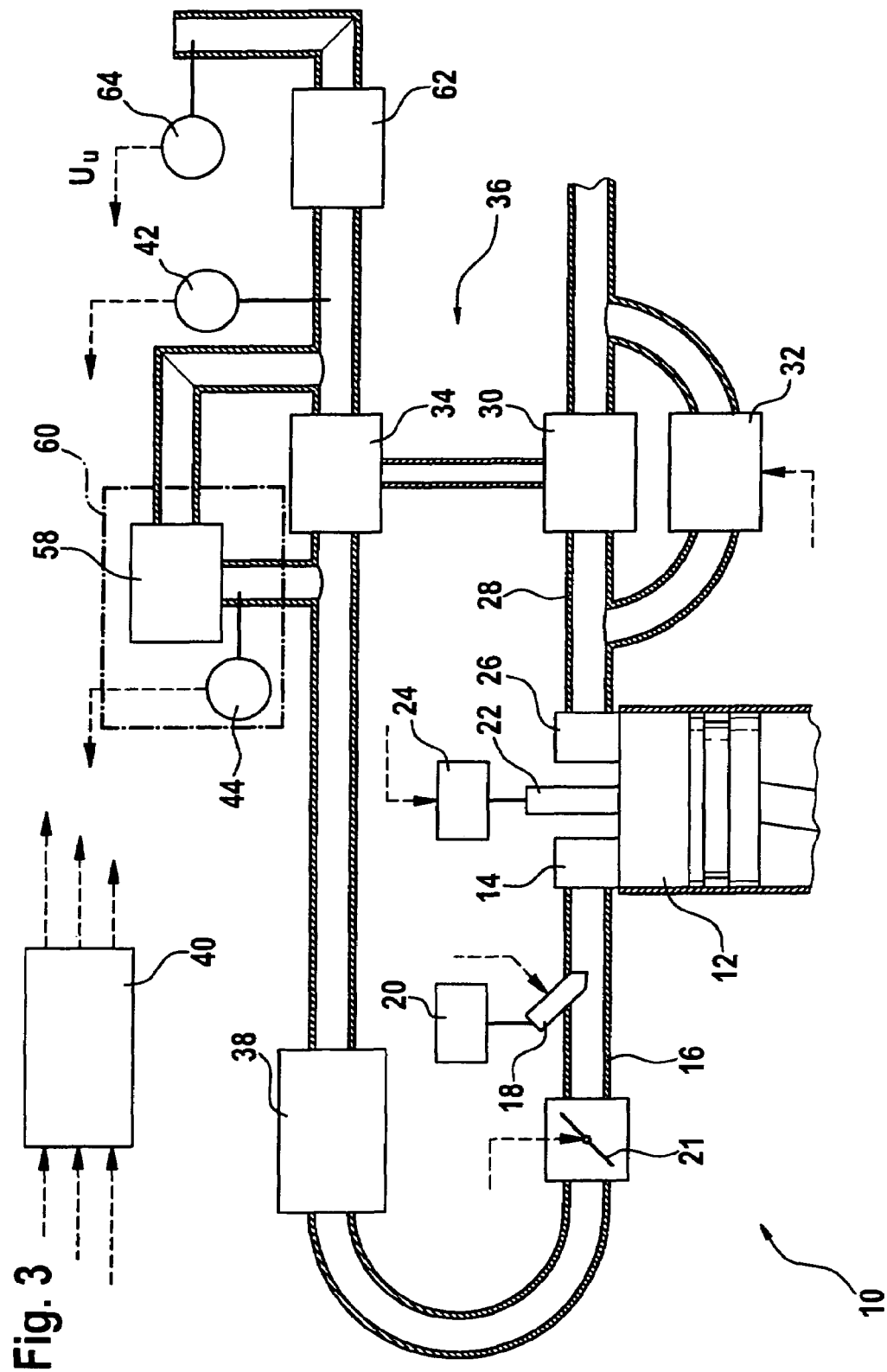
FIG. 3 shows a schematic representation of another example embodiment of an internal combustion engine having an exhaust gas turbocharger and a pressure sensor according to the present invention.

FIG. 3 depicts an alternative example embodiment of an internal combustion engine 10. In this context, it should be noted that such elements and regions which have equivalent functions to elements and regions in FIG. 1 are not explained again in detail.

In internal combustion engine 10 shown in FIG. 3, pressure sensor 44 is not situated directly in intake duct 16, downstream from compressor 34, but is integrated, together with a pop-off valve 58, in a unit 60. Pop-off valve 58 opens when throttle valve 21 is closed, in order to make possible a rapid reduction in pressure in intake duct 16.

In FIG. 3, upstream of HFM sensor 42 in intake duct 16, an air filter 62 is also situated, and upstream of it, in turn, an environmental pressure sensor 64 is present. As may be seen in FIG. 2, its signal $U_u$, together with averaged signal $U_{p-m}$, which is obtained using pressure sensor 44, is fed to a comparison block 66. If it is determined that the difference between these two signals, or rather the pressure values determined from them, exceeds a boundary value, a measure is carried out in 68. This measure may be, for instance, an entry into a fault memory, by which it is signaled, during a maintenance procedure, that air filter 62 has been used up or clogged, and has to be replaced.

What is claimed is:

1. A method for determining a rotary speed of a compressor of an internal combustion engine, comprising:
   detecting a pressure in a region downstream from the compressor;
   generating a pressure signal corresponding to the detected pressure; and
   determining the rotary speed of the compressor based on periodic fluctuations of at least one component of the pressure signal.

2. The method as recited in claim 1, wherein the pressure is detected immediately downstream from the compressor.

3. The method as recited in claim 2, further comprising:
determining a pressure difference between the pressure signal and a signal of an environmental pressure sensor; and
determining a functional state of an air filter based on the pressure difference.

4. The method as recited in claim 2, further comprising:
separating the periodic fluctuations from the pressure signal by a high-pass filtering.

5. The method as recited in claim 4, further comprising:
ascertaining a frequency of the periodic fluctuations by a frequency analysis, wherein the frequency analysis includes a Fourier transformation.

6. The method as recited in claim 5, wherein the rotary speed of the compressor is determined by a division of the frequency by one of a) the number of vanes of the compressor and b) the number of blades of the compressor.

7. The method as recited in claim 5, further comprising:
ascertaining an average value of the pressure signal by a low-pass filtering of the pressure signal.

8. The method as recited in claim 7, further comprising:
determining a pressure difference between the pressure signal and a signal of an environmental pressure sensor; and
determining a functional state of an air filter based on the pressure difference.

9. The method as recited in claim 7, further comprising:
correcting the average value of the pressure signal in such a way that the corrected pressure signal corresponds at least approximately to a signal representing the pressure at a location downstream of a charge-air cooler.

10. The method as recited in claim 9, wherein at least one correcting factor is used which is a function of a current operating variable of the internal combustion engine, and wherein the current operating variable includes one of an air mass flow and an air volume flow.

11. A computer-readable storage medium storing a computer-executable program, wherein the computer-executable program is configured to perform, when executed by a computer, a method comprising:
detecting a pressure in a region downstream from the compressor;
generating a pressure signal corresponding to the detected pressure; and
determining the rotary speed of the compressor based on periodic fluctuations of at least one component of the pressure signal, wherein the determining includes:
separating the periodic fluctuations from the pressure signal by a high-pass filtering;
ascertaining a frequency of the periodic fluctuations by a frequency analysis, wherein the frequency analysis includes a Fourier transformation; and
dividing the frequency by one of a) the number of vanes of the compressor and b) the number of blades of the compressor to determine the rotary speed of the compressor.

12. A control device for an internal combustion engine, comprising:
a sensor unit configured to detect a pressure in a region downstream from the compressor and generate a pressure signal corresponding to the detected pressure; and
a means for determining the rotary speed of the compressor based on periodic fluctuations of at least one component of the pressure signal, wherein the means for determining the rotary speed includes:
a means for separating the periodic fluctuations from the pressure signal by a high-pass filtering;
a means for ascertaining a frequency of the periodic fluctuations by a frequency analysis, wherein the frequency analysis includes a Fourier transformation; and
a means for dividing the frequency by one of a) the number of vanes of the compressor and b) the number of blades of the compressor to determine the rotary speed of the compressor.

13. A compressor system for an internal combustion engine system, comprising:
a compressor situated in an air supply duct through which air is supplied to a combustion chamber;
a pressure sensor configured to detect a pressure in a region downstream from the compressor and generate a pressure signal corresponding to the detected pressure; and
a control unit for determining the rotary speed of the compressor based on periodic fluctuations of at least one component of the pressure signal, wherein the control unit includes:
a means for separating the periodic fluctuations from the pressure signal by a high-pass filtering;
a means for ascertaining a frequency of the periodic fluctuations by a frequency analysis, wherein the frequency analysis includes a Fourier transformation; and
a means for dividing the frequency by one of a) the number of vanes of the compressor and b) the number of blades of the compressor to determine the rotary speed of the compressor.

14. The compressor system as recited in claim 13, wherein the pressure sensor is situated immediately downstream from the compressor.

15. The compressor system as recited in claim 14, wherein the pressure sensor forms a unit with a pop-off valve of the compressor.

* * * * *